Patented Nov. 28, 1939

2,181,554

UNITED STATES PATENT OFFICE 2,181,554

BENZENECARBOXYLIC ACID FLUORIDES CONTAINING TRIFLUOROMETHYL GROUPS AND PROCESS OF PREPARING THEM

Herbert Kracker, Otto Scherer, Fritz Müller, and Willy Schumacher, Frankfort-on-the-Main, Germany, assignors to General Aniline Works, Inc., New York, N. Y., a corporation of Delaware No Drawing. Application April 13, 1937, Serial No. 136,666. In Germany April 18, 1936

5 Claims. (Cl. 260—544)

The present invention relates to benzenecarboxylic acid fluorides containing trifluoromethyl groups and to a process of preparing them; more particularly, it relates to compounds of the following general formula:

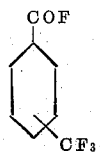

wherein the benzene nucleus may contain a further COF- or CF₃-group or another substituent.

Benzoic acid fluorides containing trifluoromethyl groups have not hitherto been known. Only the manufacture of meta-trifluoromethyl benzoic acid has been described in Bull. Acad. Roy. Belg., vol. 35, page 395. This compound has been obtained by saponification of meta-trifluoromethylbenzonitrile which was made by cyanogenating meta-amino-benzotrifluoride. This synthesis of trifluoromethylbenzoic acid is not applicable on a commercial scale, since the cyanogenation is expensive and the yields obtained are insufficient; moreover, the saponification of the nitrile is accompanied by production of isophthalic acid, which must be separated by some suitable process.

We have found that benzoic acid fluorides containing trifluoromethyl groups are obtainable by causing technically anhydrous hydrogen fluoride or antimony trifluoride to react at a raised temperature, with or without pressure, with benzenecarboxylic acid chlorides substituted by one or more trichloromethyl groups.

This result is surprising because it has not been known that compounds which contain oxygen can be fluorinated.

The trichloromethylbenzoic acid chlorides used as parent material may easily be obtained by the process of the copending United States patent application Serial No. 136,665 filed April 13, 1937, by causing water to act upon a compound of the general formula:

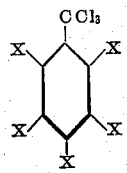

wherein at least one X is a CCl₃ group and the remaining X's represent hydrogen or substituents, at a temperature above 100° C. in the presence of a small proportion of a catalyst which accelerates the elimination of hydrogen chloride, the proportion of water being so selected that one molecule is present for each trichloromethyl group to be saponified and at least one trichloromethyl group remains unsaponified, or by causing chlorine to act upon a compound of the general formula:

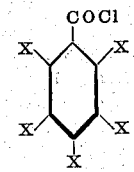

wherein at least one X means a methyl group and the other X's mean hydrogen or another substituent, in the presence or absence of phosphorus halides at a raised temperature.

The fluorination by means of technically anhydrous hydrogen fluoride or antimony trifluoride occurs very smoothly. The yields are very good. The fluorides produced give the reactions usual for acid halides and are valuable intermediates, for instance, for the manufacture of dyestuffs and pharmaceutical products.

The following examples serve to illustrate the invention, but they are not intended to limit it thereto; the parts are by weight:

(1) In an iron pressure vessel 516 parts of para-trichloromethylbenzoyl chloride are mixed with 176 parts of technically anhydrous hydrogen fluoride. The vessel is heated to about 50° C. to 100° C. whereby the pressure rises very quickly. The hydrogen chloride evolved escapes through a valve. After 2 to 3 hours the reaction is finished. The cold liquid product is washed with water in order to remove an excess of hydrogen fluoride. After drying with calcium chloride, the crude product is distilled and the trifluoromethylbenzoylfluoride is obtained in the form of a liquid clear as water which boils at 158° C. to 162° C.

In a similar manner there are obtained from the nuclear-substituted para-trichloromethylbenzoyl chlorides the corresponding nuclear-substituted para-trifluoromethylbenzoyl fluorides; for instance, from 1-trichloromethyl-2-chloro-4-benzoyl chloride the 1-trifluoromethyl-2-chloro-4-benzoyl fluoride and from the mono- or poly-bromo-derivatives or the poly-chloro-derivatives the corresponding substitution products of para-trifluoromethyl-benzoyl fluoride.

(2) If 176 parts of technically anhydrous hydrogen fluoride are caused to react in a manner analogous to that described in Example 1 with 516 parts of ortho-trichloro-methylbenzoylchloride there is obtained the ortho-trifluoromethyl-benzoylfluoride in the form of a liquid clear as water which boils at 158° C. to 162° C.

(3) In an iron vessel provided with a rectifying column 516 parts of meta-trichloromethylbenzoyl chloride are mixed with 650 parts of antimony trifluoride. The vessel is heated to about 180° C. to 200° C. and the metatrifluoromethylbenzoyl fluoride obtained is distilled. There is at once obtained a liquid clear as water which boils at 159° C. to 163° C. In this case too there are obtained from the nuclear-substituted products, for instance, the mono- and poly-chloro- or -bromo-derivatives the corresponding meta-trifluoromethylbenzoyl fluorides.

(4) In a manner similar to that described in Example 1 155 parts of hydrogen fluoride are caused to act upon 375 parts of 3,5-bis-trichloromethylbenzoyl chloride at a temperature between about 100° C. and about 150° C. The 3,5-bis-trifluoromethylbenzoyl fluoride thus obtained boils at 158° C. to 162° C. The product may also be obtained as indicated in Example 3 by reaction of 650 parts of antimony trifluoride with 375 parts of 3,5-bis-trichloromethylbenzoyl chloride. In the same way the corresponding halogen derivatives of 3,5-bis-trifluoromethylbenzoyl fluoride are obtained from the halogen-substitution products of 3,5-bis-trichloromethylbenzoyl chloride.

(5) When 110 parts of technically anhydrous hydrogen fluoride or 410 parts of antimony trifluoride are caused to react in the manner described in Example 1 or 3 respectively with 321 parts of 5-trichloromethyl-1,3-benzenedicarboxylic acid chloride, the 5-trifluoromethyl-1,3-benzenedicarboxylic acid fluoride is obtained with a very good yield in the form of a liquid clear as water which boils under a pressure of 15 mm. at 88° C. From the nuclear substitution products of 5-trichloromethyl-1,3-benzenedicarboxylic acid chloride, for instance, the mono- and poly-halogen derivatives, there are likewise obtained the correspondingly substituted 5-trifluoromethyl-1,3-benzenedicarboxylic acid fluorides.

By causing hydrogen fluoride or antimony trifluoride to act upon 4-trichloromethyl-1,2-benzenedicarboxylic acid chloride the 4-trifluoromethyl-1,2-benzenedicarboxylic acid fluoride is obtained in the form of a liquid clear as water.

We claim:

1. The process which comprises causing a fluorinating agent of the group consisting of technically anhydrous hydrogen fluoride and antimony trifluoride to react at a temperature of about 50° C. to about 200° C. with a compound of the following general formula:

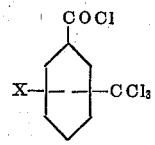

wherein X stands for a member of the group consisting of hydrogen, halogen, a $CCl_3$- and a $COCl$-group.

2. The process which comprises causing technically anhydrous hydrogen fluoride to react at a temperature of about 50° C. to about 150° C. with a compound of the following general formula:

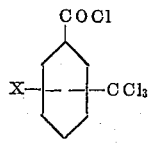

wherein X stands for a member of the group consisting of hydrogen, halogen, a $CCl_3$- and a $COCl$-group.

3. The compounds of the following general formula:

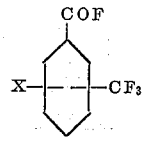

wherein X stands for a member of the group consisting of hydrogen, halogen, a $CF_3$- and a $COF$-group, being colorless liquids and giving the reactions usual for acid halides.

4. The compound of the following formula:

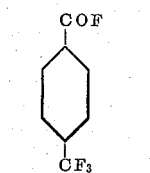

being a liquid clear as water which boils at 158° C. to 162° C.

5. The compound of the following formula:

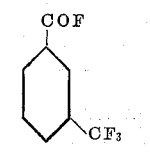

being a liquid clear as water which boils at 159° C. to 163° C.

HERBERT KRACKER.
OTTO SCHERER.
FRITZ MÜLLER.
WILLY SCHUMACHER.